US008213293B2

(12) United States Patent
Lee et al.

(10) Patent No.: US 8,213,293 B2
(45) Date of Patent: Jul. 3, 2012

(54) METHOD FOR IMPLEMENTING TRANSMIT DIVERSITY AT A WIRELESS MOBILE COMMUNICATION SYSTEM ADOPTING SC-FDMA SCHEME

(75) Inventors: Dae Won Lee, Gyeonggi-do (KR); Yu Jin Noh, Gyeonggi-do (KR); Bong Hoe Kim, Gyeonggi-do (KR); Young Woo Yun, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 370 days.

(21) Appl. No.: 12/540,306

(22) Filed: Aug. 12, 2009

(65) Prior Publication Data

US 2010/0067368 A1 Mar. 18, 2010

Related U.S. Application Data

(60) Provisional application No. 61/088,359, filed on Aug. 13, 2008, provisional application No. 61/088,732, filed on Aug. 14, 2008.

(30) Foreign Application Priority Data

Dec. 8, 2008 (KR) ........................ 10-2008-0124082

(51) Int. Cl.
*H04J 11/00* (2006.01)

(52) U.S. Cl. ........................................................ 370/208

(58) Field of Classification Search .................. 370/334, 370/335, 336, 337, 338, 339, 342, 343, 344, 370/208, 210

See application file for complete search history.

(56) References Cited

U.S. PATENT DOCUMENTS

2007/0189151 A1* 8/2007 Pan et al. ...................... 370/210
2007/0291638 A1* 12/2007 Chae et al. .................... 370/208
2008/0101440 A1* 5/2008 Lee .............................. 375/141
2008/0165893 A1* 7/2008 Malladi et al. ................ 375/299
2009/0080549 A1* 3/2009 Khan et al. .................... 375/260
2011/0075651 A1* 3/2011 Jia et al. ........................ 370/344

* cited by examiner

*Primary Examiner* — Huy D Vu
*Assistant Examiner* — Dady Chery
(74) *Attorney, Agent, or Firm* — Lee, Hong, Degerman, Kang & Waimey

(57) ABSTRACT

A method for implementing transmit diversity in a wireless mobile communication system adopting an SC-FDMA scheme is provided. A sequence of modulation symbols output from a DFT block are precoded prior to IFFT. The precoding is performed independently on an antenna basis. Modulation symbols mapped to each subcarrier of an SC-FDMA symbol, to be transmitted through each antenna may be additionally phase-shifted.

9 Claims, 11 Drawing Sheets

METHOD FOR IMPLEMENTING TRANSMIT DIVERSITY AT A WIRELESS MOBILE COMMUNICATION SYSTEM ADOPTING SC-FDMA SCHEME

Pursuant to 35 U.S.C. § 119, this application claims the benefit of earlier filing date and right of priority to Korean Patent Application No. 10-2008-0124082, filed on Dec. 8, 2008, and also claims the benefit of U.S. Provisional Application Ser. Nos. 61/088,732, filed on Aug. 14, 2008, and 61/088,359, filed on Aug. 13, 2008, the contents of which are hereby all incorporated by reference in their entirety.

BACKGROUND OF THE INVENTION

1. Field of the Invention

The present invention relates to a wireless mobile communication system and, more particularly, to a method for implementing transmit diversity in a wireless mobile communication system adopting a Single Carrier-Frequency Division Multiple Access (SC-FDMA) scheme.

2. Discussion of the Related Art

Conventionally, a single Transmit (Tx) antenna and a single Receive (Rx) antenna are used. Multi-Input Multi-Output (MIMO) uses a plurality of Tx antennas and a plurality of Rx antennas to thereby increase the transmission and reception efficiency of data. That is, the use of multiple antennas at both a transmitter and a receiver may increase capacity and performance in a wireless communication system. Hereinbelow, MIMO may be referred to as 'multi-antenna'.

The multi-antenna technology does not depend on a single antenna path to receive a whole message. Rather, it completes the data by combining data fragments received through a plurality of antennas. With the multi-antenna technology, data rate may be increased within a cell area of a certain size, or system coverage may be extended with a predetermined data rate ensured. Furthermore, this technology may find its use in a wide range including mobile terminals, relays, etc. The multi-antenna technology may overcome transmission capacity problems encountered with the conventional single-antenna technology.

FIG. 1 illustrates the configuration of a typical MIMO communication system. Referring to FIG. 1, a transmitter has $N_T$ Tx antennas and a receiver has $N_R$ Rx antennas. The use of a plurality of antennas at both the transmitter and the receiver increases a theoretical transmission capacity, compared to the use of a plurality of antennas at only one of the transmitter and the receiver. The channel transmission capacity increases in proportion to the number of antennas. Hence, the transmission rate and the frequency efficiency may be increased. Given a maximum transmission rate $R_o$ in case of a single antenna, the transmission rate may be increased, in theory, to the product of $R_o$ and $R_i$ in case of multiple antennas, where $R_i$ is an increase rate of the transmission rate.

For instance, a MIMO communication system with four Tx antennas and four Rx antennas may achieve a four-fold increase in transmission rate theoretically, relative to a single-antenna system. Since the theoretical capacity increase of the MIMO system was proved in the middle 1990's, many techniques have been actively studied to increase data rate in real implementation. Some of the techniques have already been reflected in various wireless communication standards for 3$^{rd}$ Generation (3G) mobile communications, future-generation Wireless Local Area Network (WLAN), etc.

There are two types of MIMO schemes: spatial diversity and spatial multiplexing. Spatial diversity increases transmission reliability using symbols that have passed in multiple channel paths, whereas spatial multiplexing increases transmission rate by transmitting a plurality of data symbols simultaneously through a plurality of Tx antennas. The advantages of these two schemes may be taken by using them in an appropriate combination.

Active studies are underway in many respects regarding the MIMO technology, inclusive of studies of information theory related to calculation of multi-antenna communication capacity in diverse channel environments and multiple access environments, studies of measuring radio channels and deriving a model for a MIMO system, studies of time-space signal processing techniques to increase transmission reliability and transmission rate, etc. Especially, it is necessary to conduct a study of a method for efficiently implementing transmit diversity to increase transmission reliability in an SC-FDMA system.

SUMMARY OF THE INVENTION

Accordingly, an object of the present invention is to provide a method for efficiently implementing spatial diversity and/or frequency selectivity in a MIMO SC-FDMA wireless mobile communication system.

To achieve these objects and other advantages and in accordance with the purpose of the invention, as embodied and broadly described herein, a method for transmitting a signal in a wireless mobile communication device operating in SC-FDMA and MIMO with N transmit antennas includes generating a sequence of second modulation symbols by Discrete Fourier Transform (DFT)-processing a sequence of first modulation symbols, generating a sequence of third modulation symbols for each transmit antenna by precoding the sequence of second modulation symbols independently for each transmit antenna, and transmitting a signal generated by Inverse Fast Fourier Transform (IFFT)-processing the sequence of third modulation symbols through a transmit antenna corresponding to the signal.

A precoding vector used for the precoding may be changed for each SC-FDMA symbol.

If the sequence of second modulation symbols are denoted by $\{x^{(1)}, x^{(2)}, \ldots x^{(k)}, \ldots x^{(M)}\}$ and a sequence of third modulation symbols transmitted on an $n^{th}$ transmit antenna among N transmit antennas are denoted by $\{z^{(1)}, z^{(2)}, \ldots, z^{(k)}, \ldots z^{(M)}\}$, the sequence of second modulation symbols and the sequence of third modulation symbols may be in a relationship that $z^{(k)}=x^{(k)}\cdot e^{j\phi_n}\cdot e^{j\theta_n\cdot k}$ where $\phi_n$ and $\theta_n$ are predetermined values, M is the number of subcarriers included in a transmission band of the signal, k is the location of a subcarrier to which $x^{(k)}$ and $z^{(k)}$ are mapped, and $1\leqq k\leqq M$ and $1\leqq n\leqq N$ are satisfied.

$\phi_n$ may be a value pre-selected from $$\left\{0, \frac{2\pi}{L}\cdot 1, \frac{2\pi}{L}\cdot 2, \ldots, \frac{2\pi}{L}\cdot(L-1)\right\}.$$

$\phi_n$ may be changed for each SC-FDMA symbol.

L may be equal to M.

$\theta_n$ may be 0.

$\theta_n$ may be a value pre-selected from $$\left\{0, \frac{2\pi}{L}\cdot 1, \frac{2\pi}{L}\cdot 2, \ldots, \frac{2\pi}{L}\cdot(L-1)\right\}.$$

$\theta_n$ may be changed for each SC-FDMA symbol.

When N=2, $$\begin{bmatrix}\phi_1\\ \phi_2\end{bmatrix}$$

may be selected from $$\left\{\begin{bmatrix}1\\1\end{bmatrix},\begin{bmatrix}1\\-1\end{bmatrix},\begin{bmatrix}1\\j\end{bmatrix},\begin{bmatrix}1\\-j\end{bmatrix}\right\}.$$

When N=4, $$\begin{bmatrix}\phi_1\\ \phi_2\\ \phi_3\\ \phi_4\end{bmatrix}$$

may be selected from $$\left\{\begin{matrix}\begin{bmatrix}1\\1\\1\\1\end{bmatrix},\begin{bmatrix}1\\-j\\1\\j\end{bmatrix},\begin{bmatrix}1\\-1\\1\\-1\end{bmatrix},\begin{bmatrix}1\\j\\-1\\-j\end{bmatrix},\begin{bmatrix}1\\\frac{1-j}{\sqrt{2}}\\-j\\\frac{-1-j}{\sqrt{2}}\end{bmatrix},\begin{bmatrix}1\\\frac{-1-j}{\sqrt{2}}\\-j\\\frac{1-j}{\sqrt{2}}\end{bmatrix},\begin{bmatrix}1\\\frac{-1+j}{\sqrt{2}}\\-j\\\frac{1+j}{\sqrt{2}}\end{bmatrix},\\ \begin{bmatrix}1\\\frac{1+j}{\sqrt{2}}\\-j\\\frac{-1+j}{\sqrt{2}}\end{bmatrix},\begin{bmatrix}1\\1\\-1\\-1\end{bmatrix},\begin{bmatrix}1\\-j\\1\\-j\end{bmatrix},\begin{bmatrix}1\\-1\\-1\\1\end{bmatrix},\begin{bmatrix}1\\j\\1\\j\end{bmatrix},\begin{bmatrix}1\\1\\1\\-1\end{bmatrix},\begin{bmatrix}1\\1\\-1\\1\end{bmatrix},\begin{bmatrix}1\\-1\\1\\1\end{bmatrix},\begin{bmatrix}1\\-1\\-1\\-1\end{bmatrix}\end{matrix}\right\}.$$

According to the present invention, transmit diversity can be efficiently implemented in a MIMO SC-FDMA system.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings.

DETAILED DESCRIPTION OF THE INVENTION

Now, the above and other aspects of the present invention will be described in detail through preferred embodiments with reference to the accompanying drawings. The detailed description is intended to explain exemplary embodiments of the present invention, rather than to show the only embodiments that can be implemented according to the invention. While the following description includes specific details to help comprehensive understanding of the present invention, it is clear to those skilled in the art that the present invention can be implemented without the specific details. For example, while the following description is made, centering on certain terms, to which the present invention is not limited, they may be interchangeable with arbitrary terms in the same meaning. Wherever possible, the same reference numbers will be used throughout this specification to refer to the same or like components.

Peak power-to-Average Power Ratio (PAPR) is a parameter that represents a waveform characteristic. The PAPR is calculated by dividing the peak amplitude of a waveform by the time-averaged Root Mean Square (RMS) of the waveform. It is therefore a dimensionless quantity. Typically, the PAPR of a single-carrier signal is lower than that of a multi-carrier signal.

In Long Term Evolution (LTE)-Advanced, MIMO can be implemented by use of SC-FDMA in order to maintain a good Cubic Metric (CM) property. When a typical precoding is used, signals carrying information for a plurality of layers are multiplexed and transmitted through a single antenna. Hence, the transmitted signal can be considered to be a kind of multi-carrier signal. PAPR is related to a dynamic range that a Power Amplifier (PA) should support in a transmitter, and a CM is another measurement of the value that the PAPR represents.

Figure 1:
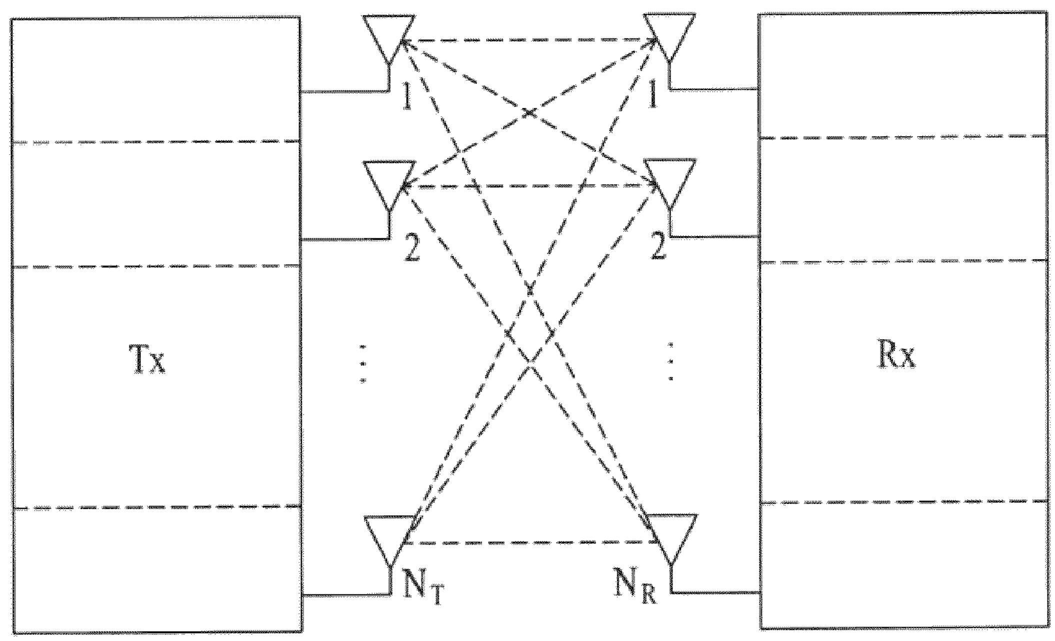
FIG. 1 illustrates the configuration of a typical MIMO communication system.

To describe a communication scheme in a MIMO system in detail, the following mathematical model may be used. On the assumption of $N_T$ Tx antennas and $N_R$ Rx antennas as illustrated in FIG. 1, the maximum rank $R_i$ of a channel matrix is given as [Equation 1].

A weak signal is amplified by a PA. The amplified signal is transmitted over the air from a User Equipment (UE) or a Node B. Although the PA generally amplifies an input signal linearly, it does not have linearity over the magnitudes of all input signals. In other words, linearity is maintained between an input signal and an output signal, when the input signal is within a certain range. However, the linearity is impaired beyond the certain input range and thus the output signal is an amplified distortion of the input signal.

Figure 2:
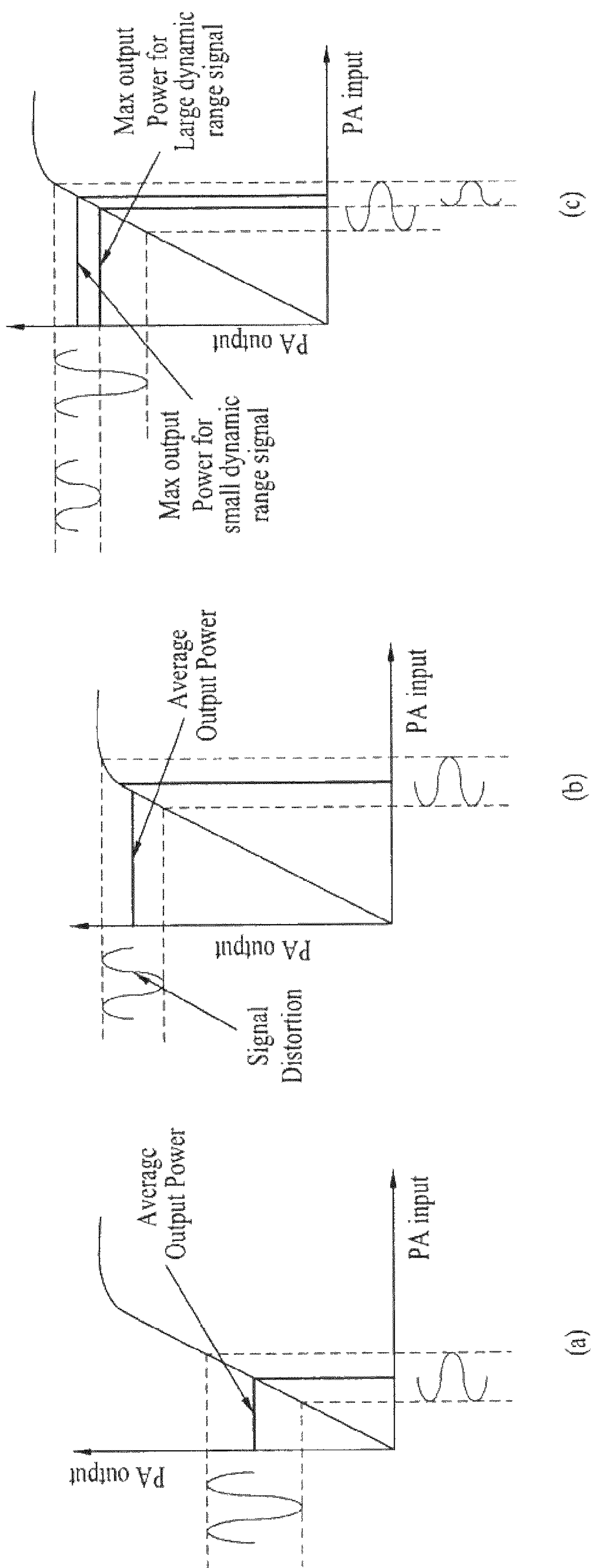
FIGS. 2A, 2B and 2C illustrate the distortion of a signal amplified by a Power Amplifier (PA).

FIGS. 2A, 2B and 2C illustrate the distortion of a signal amplified by a PA.

FIG. 2A is a graph illustrating linear amplification of a PA input signal to a PA output signal.

FIG. 2B is a graph illustrating signal distortion, when a PA input signal reaches a non-linear region of the PA.

Based on the above-described property, the PA should be able to operate in a linear region by maintaining a higher average output power for an input signal with a narrow dynamic range and reducing the average output power of an input signal with a wide dynamic range (see FIG. 2C). The amount of average output power back-off required according to the dynamic range of an input signal is called a power derating metric and a CM is a value representing the power derating metric. Therefore, a signal with a CM of 2.2 dB has a less available maximum output power than a signal with a CM of 1.2 dB by 1 dB.

$$R_i=\min(N_T,N_R) \quad \text{[Equation 1]}$$

Regarding a transmission signal, if $N_T$ Tx antennas are used, up to $N_T$ pieces of information can be transmitted, as expressed as the following vector.

$$s=[s_1, s_2, \ldots, s_{N_T}]^T \quad \text{[Equation 2]}$$

A different transmit power may be applied to each piece of transmission information $s_1, s_2, \ldots, s_{N_T}$. Let the transmit power levels of the transmission information be denoted by $P_1, P_2, \ldots, P_{N_T}$, respectively. Then the power-controlled transmission information $\hat{s}$ may be given as [Equation 3].

$$\hat{s}=[\hat{s}_1, \hat{s}_2, \ldots, \hat{s}_{N_T}]^T=[P_1s_1, P_2s_2, \ldots, P_{N_T}s_{N_T}]^T \quad \text{[Equation 3]}$$

$\hat{s}$ may be expressed as a diagonal matrix P of transmit power. Then the power-controlled transmission information $\hat{s}$ may be given as [Equation 4].

$$\hat{s}=\begin{bmatrix} P_1 & & & 0 \\ & P_2 & & \\ & & \ddots & \\ 0 & & & P_{N_T} \end{bmatrix}\begin{bmatrix} s_1 \\ s_2 \\ \vdots \\ s_{N_T} \end{bmatrix}=Ps \quad \text{[Equation 4]}$$

Meanwhile, actual $N_T$ transmitted signals $x_1, x_2, \ldots, x_{N_T}$ may be configured by applying a weight matrix W to the power-controlled information vector $\hat{s}$. The weight matrix W functions to appropriately distribute the transmission information to the Tx antennas according to transmission channel statuses, etc. These transmitted signals $x_1, x_2, \ldots, x_{N_T}$ are represented as a vector x, which may be determined as $$x=\begin{bmatrix} x_1 \\ x_2 \\ \vdots \\ x_i \\ \vdots \\ x_{N_T} \end{bmatrix}=\begin{bmatrix} w_{11} & w_{12} & \ldots & w_{1N_T} \\ w_{21} & w_{22} & \ldots & w_{2N_T} \\ \vdots & & \ddots & \\ w_{i1} & w_{i2} & \ldots & w_{iN_T} \\ \vdots & & \ddots & \\ w_{N_T1} & w_{N_T2} & \ldots & w_{N_TN_T} \end{bmatrix}\begin{bmatrix} \hat{s}_1 \\ \hat{s}_2 \\ \vdots \\ \hat{s}_j \\ \vdots \\ \hat{s}_{N_T} \end{bmatrix}=W\hat{s}=WPs \quad \text{[Equation 5]}$$

The signal vector x is represented as follows. Herein, $w_{ij}$ denotes a weight for a $j^{th}$ piece of information $\hat{s}_j$ transmitted through an $i^{th}$ Tx antenna and the weights are expressed as the matrix W. W is referred to as a weight matrix or a precoding matrix.

The afore-mentioned transmitted signal x may be considered in two cases: spatial diversity and spatial multiplexing.

In spatial multiplexing, different signals are multiplexed prior to transmission. Accordingly, the elements of the information vector s have different values. In contrast, the same signal is transmitted in a plurality of channel paths in spatial diversity. As a result, the elements of the information vector s have the same value.

Spatial multiplexing and spatial diversity may be used in combination. For example, the same signal may be transmitted through some Tx antennas in spatial diversity, while different signals may be transmitted through the other Tx antennas in spatial multiplexing.

For $N_R$ Rx antennas, signals received at the Rx antennas, $y_1, y_2, \ldots, y_{N_R}$ may be represented as the following vector.

$$y=[y_1, y_2, \ldots, y_{N_R}]^T \quad \text{[Equation 6]}$$

In the mean time, when channels are modeled in the MIMO communication system, they may be distinguished according to the indexes of Tx and Rx antennas and the channel between a $j^{th}$ Tx antenna and an $i^{th}$ Rx antennas may be represented as $h_{ij}$. It is to be noted herein that the index of the Rx antenna precedes that of the Tx antenna in $h_{ij}$.

The channels may be represented as vectors and a matrix by grouping them. The vector representation of channels may be carried out in the following manner.

Figure 3:
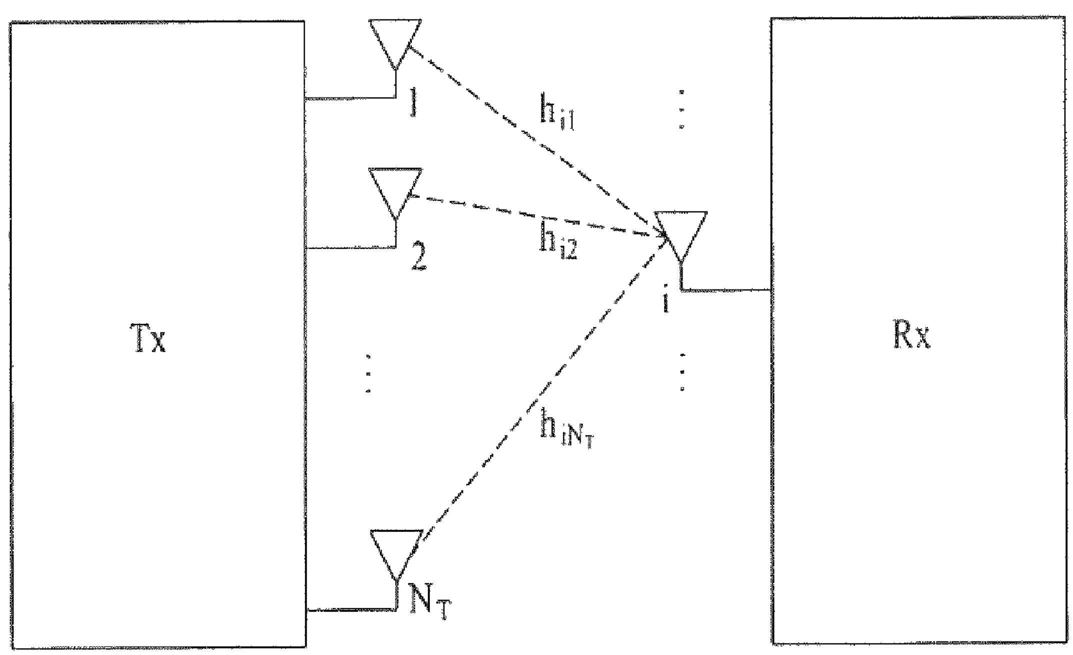
FIG. 3 illustrates channels from $N_T$ Tx antennas to an $i^{th}$ Rx antenna.

FIG. 3 illustrates channels from $N_T$ Tx antennas to an $i^{th}$ Rx antenna.

Referring to FIG. 3, the channels from the $N_T$ Tx antennas to the $i^{th}$ Rx antenna may be expressed as [Equation 7]

$$h_i^T=[h_{i1}, h_{i2}, \ldots, h_{iN_T}] \quad \text{[Equation 7]}$$

Also, channels from $N_T$ Tx antennas to $N_R$ Rx antennas may be expressed as the following matrix.

$$H=\begin{bmatrix} h_1^T \\ h_2^T \\ \vdots \\ h_i^T \\ \vdots \\ h_{N_R}^T \end{bmatrix}=\begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R1} & h_{N_R2} & \ldots & h_{N_RN_T} \end{bmatrix} \quad \text{[Equation 8]}$$

An matrix operation on actual channels is performed with the above channel matrix H and then the actual channels are added with Additive White Gaussian Noise (AWGN). The AWGN $n_1, n_2, \ldots, n_{N_R}$ added to the $N_R$ Rx antennas is given as the following vector.

$$n=[n_1, n_2, \ldots, n_{N_R}]^T \quad \text{[Equation 9]}$$

From the above modeled equations, the received signal is $$y=\begin{bmatrix} y_1 \\ y_2 \\ \vdots \\ y_i \\ \vdots \\ y_{N_R} \end{bmatrix} \quad \text{[Equation 10]}$$

-continued $$= \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix}$$

$$= Hx + n$$

The above-described MIMO operation is for a single user in the MIMO communication system. When the MIMO communication system operates for multiple users, multi-user diversity may be achieved. Now a description will be made of the multi-user diversity.

A fading channel is a main cause of performance degradation in a wireless communication system. A channel gain varies in time, frequency, and space. As the channel gain decreases, the performance degradation becomes serious. As one technique for overcoming fading, diversity is based on the fact that there is a very low probability that a plurality of independent channels all have low gains. There are various diversity schemes, one of which is multi-user diversity.

A description will be made below of codewords used in the MIMO communication system. A transmitter encodes transmission information using a forward error correction code prior to transmission in order to enable a receiver to correct channel errors in a typical communication system. After demodulating the received signal, the receiver recovers the transmission information by decoding the demodulated signal using the error correction code. In this manner, channel errors of the received signal are corrected during the decoding.

Every error correction code has its maximum limit in channel error correction. That is, if a received signal has errors beyond the limit of an error correction code, the receiver cannot decode the received signal to error-free information. Accordingly, the receiver needs a criterion by which it determines whether the decoded information has errors or not. Aside from the error correction, a special coding process is required for error detection. In general, a Cyclic Redundancy Check (CRC) is used as an error detection code.

CRC is one of coding methods for error detection, not for error correction. Typically, the transmitter encodes transmission information with a CRC and then encodes the CRC-coded information with an error correction code. The resulting one coded unit is called "codeword".

In the mean time, in the case where a plurality of pieces of transmission information are overlapped in a received signal, performance improvement may be expected by use of an interference-cancellation receiver. For example, the overlapped transmission may be performed by a MIMO scheme, a multi-user detection scheme, or a multi-code scheme. Interference cancellation will be described below in brief.

First, a first signal from the whole received signal with the transmission information overlapped is demodulated and decoded. Then information related to the first signal is eliminated from the whole received signal. A second signal is demodulated and decoded from the received signal free of the first signal. A third signal is demodulated and decoded from the received signal free of the first and second signals. In this manner, demodulated and decoded signals are eliminated continuously from the received signal, thereby improving demodulation and decoding performance. This is called Successive Interference Cancellation (SIC).

No errors should exist in a demodulated and decoded signal eliminated from the received signal to make an interference cancellation scheme such as SIC viable. If errors are present in the demodulated and decoded signal, they adversely affect demodulation and decoding of all of the subsequent signals. This is called an error propagation phenomenon.

The foregoing interference cancellation technique may be applied to MIMO. The interference cancellation technique may be used when a plurality of pieces of transmission information are transmitted overlapped across multiple antennas. That is, interference cancellation may be performed during detection of each piece of transmission information, when spatial multiplexing is used.

As stated before, preferably, it is determined whether a demodulated and decoded signal has errors and then interference is selectively eliminated in order to minimize the error propagation phenomenon that appears during the interference cancellation. The error check may be performed using a CRC, as described before. Generally, an identifiable information unit that has been CRC-encoded may be referred to as 'codeword'. Therefore, interference cancellation is performed for multiple codewords as well as for multiple pieces of transmission information.

The numbers of rows and columns in the channel matrix H representing channel statuses are determined according to the numbers of Tx and Rx antennas. The number of rows is identical to that of the Rx antennas, $N_R$ and the number of columns is identical to that of the Tx antennas, $N_T$. Thus, the channel matrix H is of size $N_R*N_T$.

In general, the rank of a matrix is defined as the minimum of the numbers of independent rows or columns. Accordingly, the rank of the matrix is not larger than the number of rows or columns. For example, the rank of the matrix H, rank(H) is limited as follows.

$$\text{rank(H)} \leqq \min(N_T, N_R) \quad \text{[Equation 11]}$$

If the matrix is eigen value-decomposed, its rank may be defined as the number of non-zero eigen values. Similarly, in case of Singular Value Decomposition (SVD), the rank may be defined as the number of non-zero singular values. Therefore, the rank of a channel matrix physically means the maximum number of different pieces of information that can be transmitted on given channels.

A different piece of information transmitted in MIMO is referred to as 'transmission stream' or shortly 'stream'. The 'stream' may be called 'layer'. It is thus concluded that the number of transmission streams is not larger than the rank of channels, i.e. the maximum number of transmittable different pieces of information.

The channel matrix H is determined by $$\#\text{ of streams} \leqq \text{rank}(H) \leqq \min(N_T, N_R) \quad \text{[Equation 12]}$$

# of streams denotes the number of streams. One thing to be noted herein is that one stream may be transmitted through one or more antennas.

One or more streams may be mapped to a plurality of antennas in various manners. The mapping can be considered as follows according to MIMO types. It can be said that transmission of one stream through a plurality of antennas corresponds to spatial diversity and transmission of a plurality of streams through a plurality of antennas corresponds to spatial multiplexing. Obviously, spatial diversity and spatial multiplexing may be used in a hybrid manner.

Now a description will be made of the relationship between codewords and streams in the MIMO system.

Figure 4:
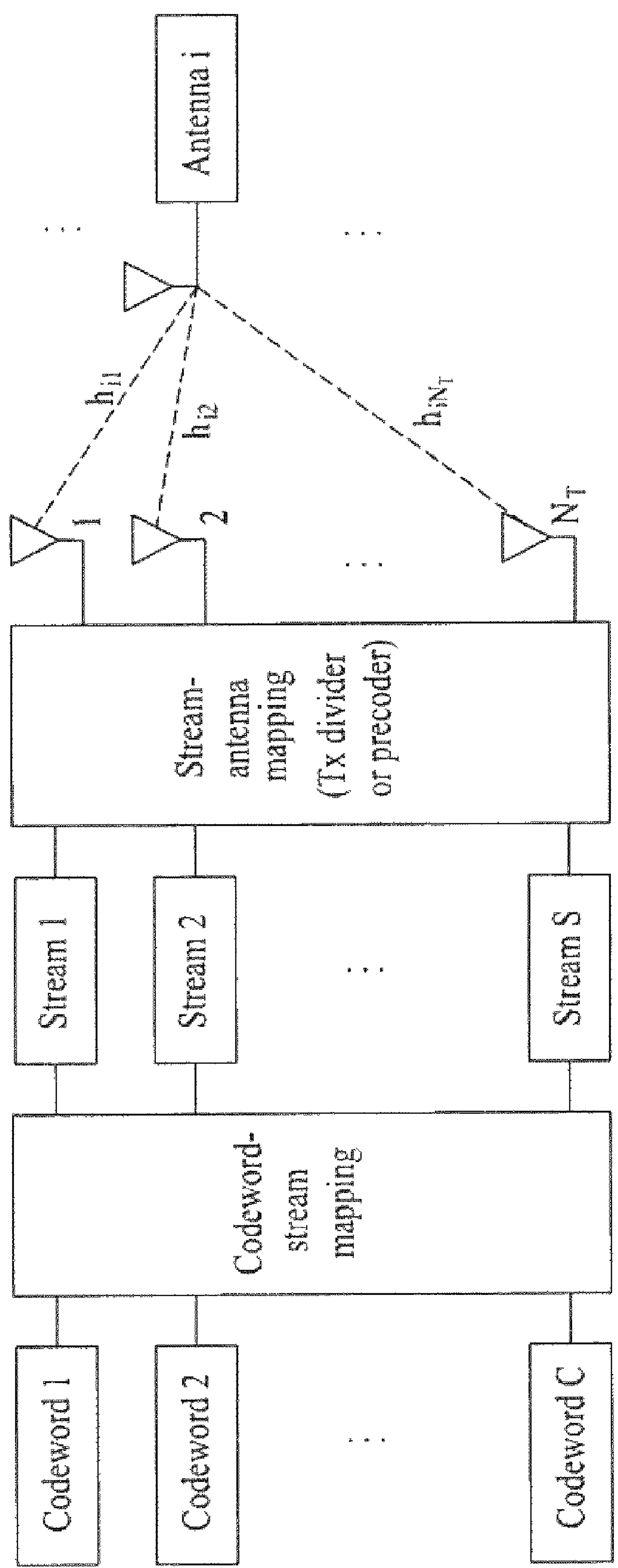
FIGS. 4 and 5 illustrate a relationship among antennas, streams, and codewords in a MIMO communication system.
Figure 5:
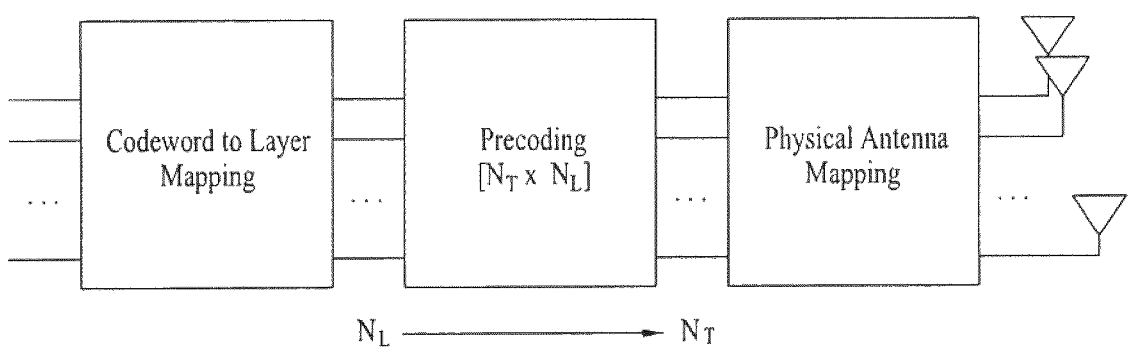

FIGS. 4 and 5 illustrate a relationship among antennas, streams, and codewords in the MIMO communication system.

Codewords may be mapped to streams in many ways. Referring to FIG. 4, a codeword or codewords are generated. Each codeword is mapped to a transmission stream or transmission streams in a codeword-stream mapping module. Each stream is mapped to a transmission antenna in a stream-antenna mapping module prior to transmission.

Among the above processes, a part for determining codeword-stream combinations is marked with solid lines in FIG. 4.

It is ideal to map codewords to streams freely. That is, one codeword may be transmitted distributedly in a plurality of streams, and a plurality of codewords may be transmitted in a single stream after concatenation. However, the serial concatenation of a plurality of codewords is a kind of coding. An exemplary embodiment of the present invention will be described in the context of one codeword being mapped to one or more streams. However, those skilled in the art will appreciate that the present invention is applicable to every system including the features of the present invention.

Therefore, it is assumed that one codeword is mapped to one or more streams, unless otherwise specified. If every information is subjected to coding before transmission, the numbers of codewords and streams satisfy [Equation 13].

$$\text{\# of codewords} \leqq \text{\# of streams} \quad \text{[Equation 13]}$$

In [Equation 13], # of codewords denotes the number of codewords and # of streams denotes the number of streams.

[Equation 11], [Equation 12] and [Equation 13] are comprehensively concluded as $$\text{\# of codewords} \leqq \text{\# of streams} \; \mathrm{rank}(H) \leqq \min(N_T, N_R) \quad \text{[Equation 14]}$$

[Equation 14] tells that the maximum number of streams is limited, when the numbers of Tx and Rx antennas are limited, and the minimum number of streams is limited, when the number of codewords is limited.

According to the foregoing relationship between codewords and streams, if the number of antennas is limited, the maximum numbers of streams and codewords are limited. Thus, a limited number of codeword-stream combinations are available.

Codeword-stream combinations are needed in both a downlink and an uplink. For the convenience' sake, it is assumed that MIMO is applied to the downlink. When data is transmitted on the downlink in MIMO, the receiver can demodulate and decode a received signal successfully with correct knowledge of a codeword-stream combination used at the transmitter from among available codeword-stream combinations.

Also, for transmission of uplink control information, it is necessary to notify, for example, a preferred codeword-stream combination from among available codeword-stream combinations. More specifically, for MIMO implementation, the transmitter should know the channels and status of the receiver. Hence, the receiver should transmit control information to the transmitter on the uplink. For example, the receiver should transmit information such as a preferred codeword-stream combination and a Channel Quality Indicator (CQI) and Precoding Matrix Index (PMI) related to the preferred codeword-stream combination, taking into account receiver statuses including measured channel status and buffer status. While the specific contents of the control information may vary with a used MIMO scheme, a preferred codeword-stream combination should be notified on the uplink.

In another example, uplink MIMO and downlink MIMO are identical in that a used codeword-stream combination and a preferred codeword-stream combination among available codeword-stream combinations should be notified, except that the transmission direction is changed from 'the downlink' to 'the uplink'. If a relatively small number of bits are taken to indicate all available codeword-stream combinations effectively, control information may be transmitted efficiently. Therefore, there is a need for effectively expressing codeword-stream combinations.

A reason for rendering a CM value poor due to precoding will be considered. When a plurality of single-carrier signals with good CM values are overlapped in transmission, the CM values of the overlapped signals may be poor. In this context, the SC-FDMA system may produce transmission signals with good CM values by multiplexing information from a plurality of layers to a minimized number of single-carrier signals and transmitting them through one physical antenna.

Transmit diversity is a technology that increases the reliability of a received signal despite some poor channels. Transmit diversity applies mainly when a UE is located at a cell edge. The transmit diversity scheme is applicable to a situation where channel-based scheduling is difficult in view of fast varying channels or applicable to a channel varying environment. Besides them, there may be other environments and conditions in which transmit diversity is applicable.

Figure 6:
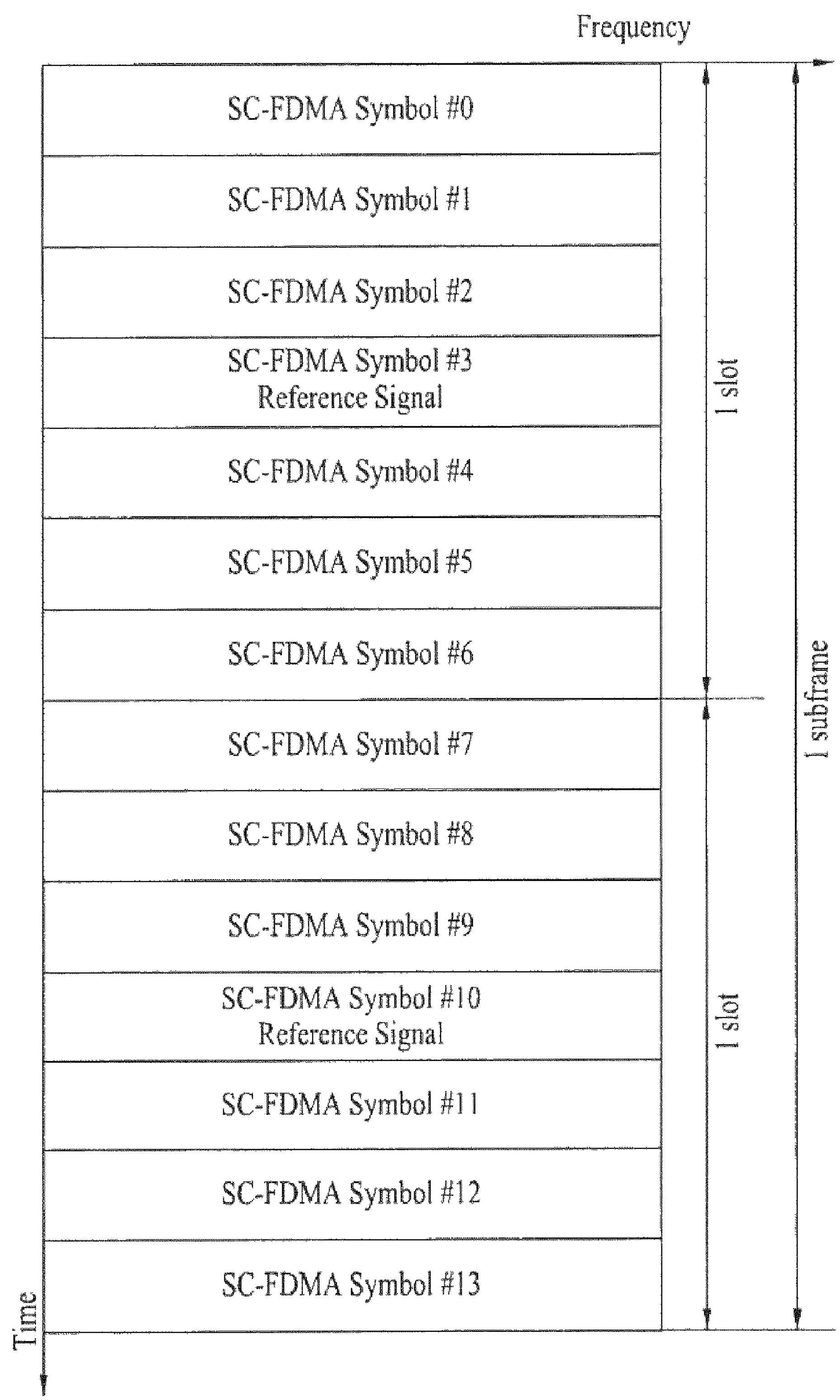
FIG. 6 illustrates a 3GPP data transmission unit.

FIG. 6 illustrates a 3GPP data transmission unit.

In 3GPP, for example, one subframe may be composed to 12 or 14 SC-FDMA symbols in total. The subframe may occupy two slots, each having 6 or 7 SC-FDMA symbols. One SC-FDMA symbol is used as a reference signal in each slot. Depending on circumstances, the first or last symbol may not be used in the slot.

Figure 7:
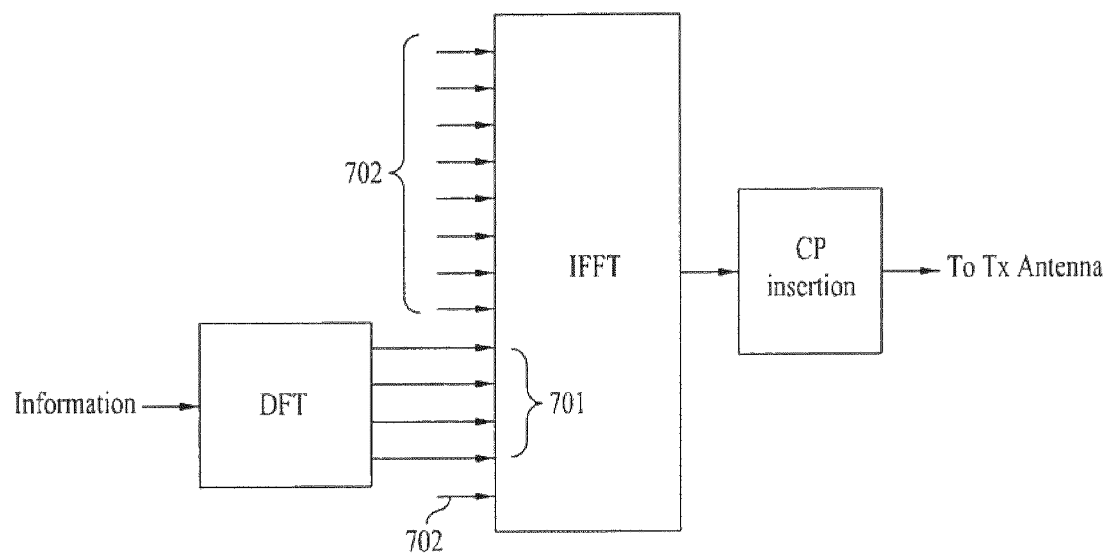
FIG. 7 is an exemplary block diagram of a transmitter in an SC-FDMA scheme.

FIG. 7 is an exemplary block diagram of a transmitter in an SC-FDMA scheme.

An SC-FDMA symbol may be generated in the following manner. First, a sequence of modulation symbols are processed in a Discrete Fourier Transform (DFT) block. The processed modulation symbols are mapped to subcarriers of a transmission band and then processed in an Inverse Fourier Transform (IFFT) block. The IFFT block may receive 0s at input ports 702 other than input ports 701 at which it receives modulation symbols from the DFT block. One SC-FDMA symbol is generated by attaching a Cyclic Prefix (CP) to the IFFT processed signal. Since the effects of the DFT operation and the IFFT operation compensate each other in the above process, an effect of single-carrier transmission of information is virtually obtained. The CM value of a single-carrier signal is relatively small. Therefore, signal distortion may be reduced at a given PA and an allowed maximum transmit power may be increased for the single-carrier signal.

The transmit diversity scheme of the present invention may increase performance, while maintaining a CM value low.

<Embodiment 1> Random Beamforming Diversity

In general, performance may be improved by forming a beam with a precoded transmission signal in MIMO. However, there is no way to acquire precoding information required for optimal beamforming without knowledge of a given channel environment. Therefore, information is transmitted, while changing a precoding matrix a plurality of times within a basic SC-FDMA transmission unit, a subframe in the present invention. As a consequence, a kind of random beamforming effect and transmit diversity are achieved.

Figure 8:
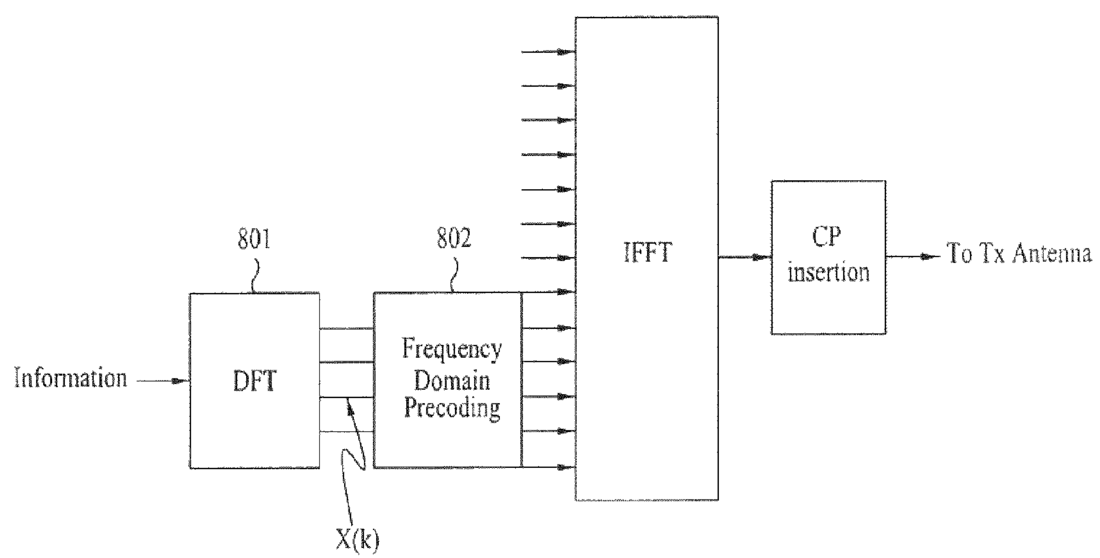
FIG. 8 is a block diagram of a structure using precoding in an SC-FDMA system according to an exemplary embodiment of the present invention.

FIG. 8 is a block diagram of a structure using precoding in an SC-FDMA system according to an exemplary embodiment of the present invention.

While it is preferred in theory to multiply DFT symbols by optimal precoding values on a subcarrier basis, the IFFT signal of information that was multiplied by a different precoding value for each subcarrier has a high CM value.

Therefore, the same precoding value is applied to each subcarrier in a transmission frequency bandwidth, while different precoding values are applied to SC-FDMA symbols, thereby achieving transmit diversity in an exemplary embodiment of the present invention.

In SC-FDMA transmission, the transmit diversity effect of SC-FDMA symbols may be achieved by using a different precoding vector for each SC-FDMA symbol.

Figure 9:
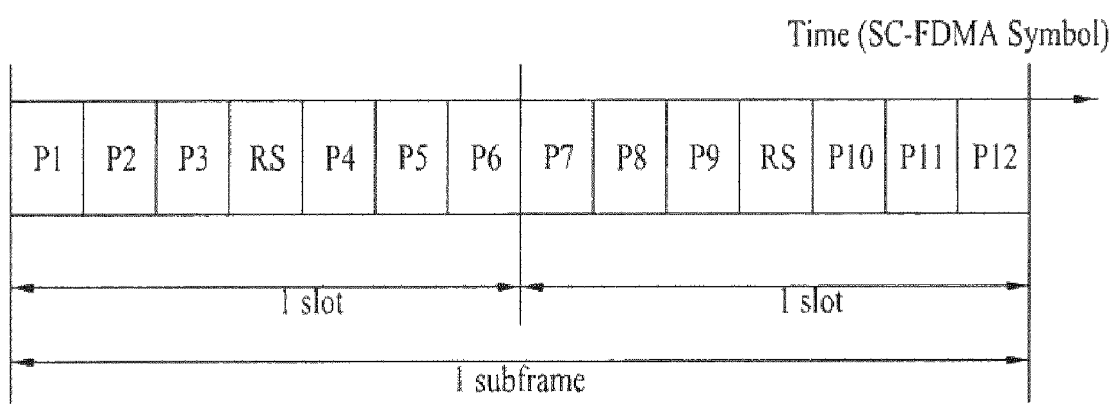
FIG. 9 illustrates a method for multiplying each SC-FDMA symbol by a different precoding vector according to an exemplary embodiment of the present invention.

FIG. 9 illustrates a method for multiplying each SC-FDMA symbol by a different precoding vector according to an exemplary embodiment of the present invention.

Referring to FIG. 9, transmit diversity may be achieved by using different rank-1 precoding matrices P1 to P12 (i.e. Mx1 matrices, M is the number of Tx antennas) to different SC-FDMA symbols. For example, symbol 1 is multiplied by a precoding matrix P1 in slot 1 and symbol 4 is multiplied by a precoding matrix P4 in slot 1.

An SC-FDMA symbol carrying an RS is not precoded and as many RSs as the number of antennas through which a UE transmits information are code-division-multiplexed and transmitted in the SC-FDMA symbol.

The precoding matrices are limited to Mx1 precoding vectors. Accordingly, the precoding matrices have the same dimension as that of rank-1 precoding matrices.

Figure 10:
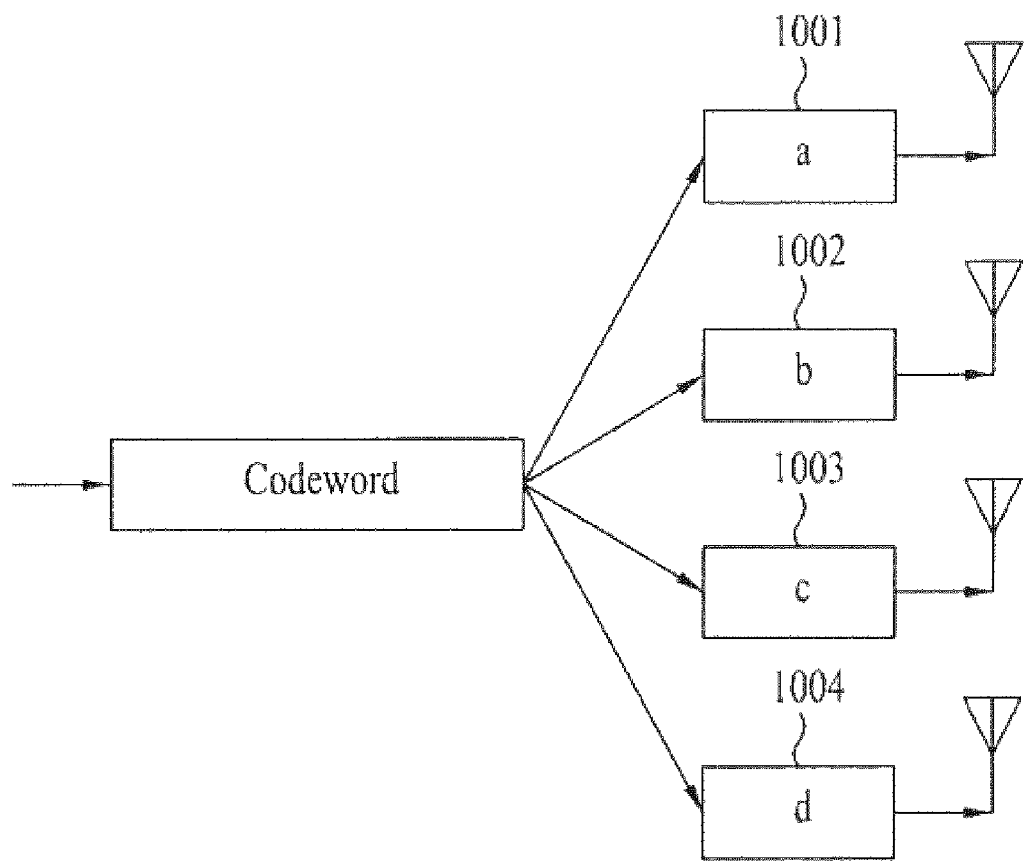
FIG. 10 illustrates an example of applying rank-1 precoding in case of four Tx antennas.

FIG. 10 illustrates an example of applying rank-1 precoding in case of four Tx antennas.

A codeword is multiplied by predetermined constants that are complex values, prior to transmission through the Tx antennas.

Referring to FIG. 10, blocks 1001, 1002, 1003 and 1004 multiply the codeword by complex values a, b, c and d, respectively and output the products to the Tx antennas. A different beam may be formed according to a combination of a, b, c and d. That is, different beams may be formed for first and second SC-FDMA symbols by multiplying the first SC-FDMA symbol by a1, b1, c1, and d1 and multiplying the second SC-FDMA symbol by a2, b2, c2, and d2.

Figure 11:
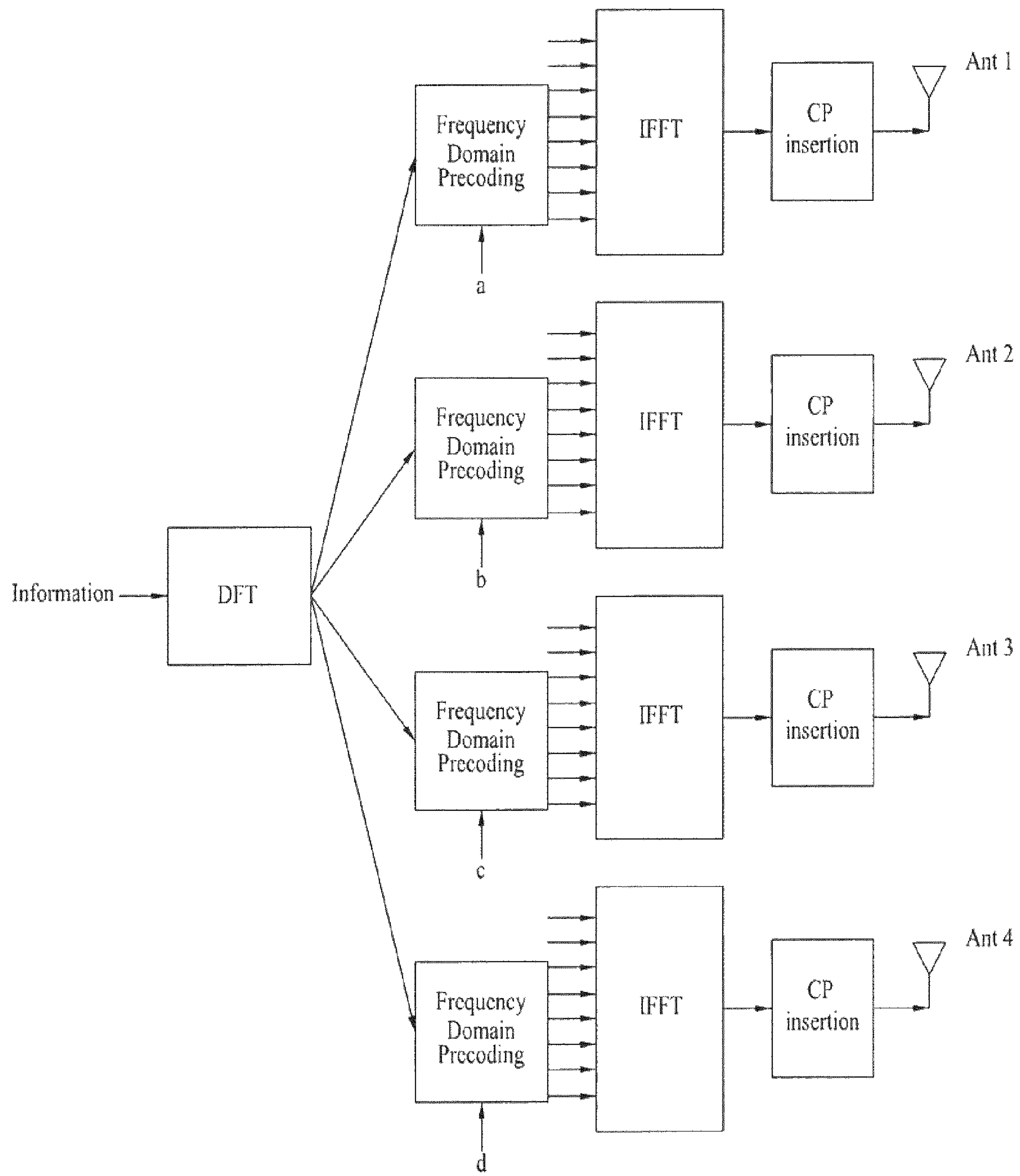
FIG. 11 illustrates the structure of FIG. 10 in detail.

FIG. 11 illustrates the structure of FIG. 10 in detail.

Referring to FIG. 11, the values of a, b, c and d may vary for each SC-FDMA symbol. The same information is processed using different precoding values and transmitted through different antennas. While frequency-domain precoding blocks, IFFT blocks, and CP insertion modules are separately configured in FIG. 11, they may be designed to share a single module in real implementation. Hereinbelow, 'frequency-domain precoding' may be referred to as 'precoding' shortly.

Referring to FIG. 8 again, let a modulation symbol that the DFT block 801 outputs to the frequency-domain precoding block 802 be denoted by $x^{(k)}$. 'k' represents the logical number of a subcarrier to which the modulation symbol $x^{(k)}$ is mapped. Because a mapping frequency position or mapping pattern may change for each modulation symbol before IFFT, a subcarrier number is a 'logical subcarrier number'.

Symbols mapped to a transmission frequency band in a particular SC-FDMA symbol may be represented as $x^{(1)}, x^{(2)}, \ldots, x^{(k)}, \ldots, x^{(M)}$. M denotes the number of modulation symbols mapped to the frequency domain. That is, M is the number of modulation symbols that are simultaneously provided to the frequency-domain precoding block 802.

Symbols $y_1^{(k)}, y_2^{(k)}, \ldots, y_N^{(k)}$ transmitted to the Tx antennas on subcarrier k in the SC-FDMA symbol are given as [Equation 15] or [Equation 16].

$$\begin{bmatrix} y_1^{(k)} \\ y_2^{(k)} \\ \vdots \\ y_N^{(k)} \end{bmatrix} = P \cdot x^{(k)} \quad \text{[Equation 15]}$$

$$\text{where } P = \begin{bmatrix} a \\ b \\ c \\ d \end{bmatrix},$$

$$a, b, c, d \in \left\{1, \frac{1+j}{\sqrt{2}}, j, \frac{1-j}{\sqrt{2}}, -1, \frac{-1-j}{\sqrt{2}}, -j, \frac{-1+j}{\sqrt{2}}\right\},$$

$$\text{and } k = 1, 2, 3, \ldots, M.$$

$$\begin{bmatrix} y_1^{(k)} \\ y_2^{(k)} \\ \vdots \\ y_N^{(k)} \end{bmatrix} = P \cdot x^{(k)}, \quad \text{[Equation 16]}$$

$$P = \begin{bmatrix} e^{j\phi_1} \\ e^{j\phi_2} \\ \vdots \\ e^{j\phi_N} \end{bmatrix}, \phi_i = \frac{2\pi}{N} i,$$

$$i = 0, 1, 2, \ldots, N-1,$$

$$k = 1, 2, 3, \ldots, M$$

In [Equation 15] and [Equation 16], $y_1^{(k)}, y_2^{(k)}, \ldots, y_N^{(k)}$ are the modulation symbols output from the frequency-domain precoding block 802 and P may be changed for each SC-FDMA symbol.

Referring to [Equation 15] and [Equation 16], the modulation symbol $x^{(k)}$ transmitted on subcarrier k is transmitted through N (e.g. N=4) Tx antennas. $y_1^{(k)}, y_2^{(k)}, \ldots, y_N^{(k)}$ may have different values according to the precoding matrix P. That is, when the single modulation symbol $x^{(k)}$ is transmitted through the different N antennas, different weights may be applied to them. Each element of the precoding vector has a limited value in [Equation 15] and [Equation 16], to which the present invention is not limited. The elements of [Equation 15] and [Equation 16] have a constant magnitude, 1 to thereby maintain the same power at each antenna.

Without consideration of a particular subcarrier, [Equation 15] is expressed as $$\begin{bmatrix} y_1 \\ y_2 \\ \vdots \\ y_N \end{bmatrix} = \begin{bmatrix} a \\ b \\ c \\ d \end{bmatrix} \cdot x, \qquad \text{[Equation 17]}$$

$$a, b, c, d \in \left\{1, \frac{1+j}{\sqrt{2}}, j, \frac{1-j}{\sqrt{2}}, -1, \frac{-1-j}{\sqrt{2}}, -j, \frac{-1+j}{\sqrt{2}}\right\}$$

According to each antenna-subcarrier combination in Embodiment 1, $y_i^{(k)}$ may be determined as $$\begin{bmatrix} y_1^{(1)} & y_1^{(2)} & \ldots & y_1^{(k)} & \ldots & y_1^{(M)} \\ y_2^{(1)} & y_2^{(2)} & \ldots & y_2^{(k)} & \ldots & y_2^{(M)} \\ \vdots & \vdots & \vdots & \vdots & \vdots & \vdots \\ y_N^{(1)} & y_N^{(2)} & \ldots & y_N^{(k)} & \ldots & y_N^{(M)} \end{bmatrix} \qquad \text{[Equation 18]}$$

In [Equation 18], the number (=N) of rows is equal to that of antennas and the number (=M) of columns is equal to that of subcarriers in the transmission signal band.

<Embodiment 2> Random Beamforming Diversity+Frequency Selective Diversity

In Embodiment 1, a precoding vector used for an SC-FDMA symbol applies commonly to all subcarriers of the SC-FDMA symbol. That is, P may vary in time but not on a subcarrier index basis in Embodiment 1. This method achieves random beamforming diversity.

In comparison with Embodiment 1, Embodiment 2 is based on Embodiment 1, but achieves both frequency selective diversity and random beamforming diversity by increasing frequency selectivity, while maintaining a CM value low.

In Embodiment 2, the modulation symbols described in [Equation 18] may be further multiplied by complex values. These complex values may be different for different antennas, or for different subcarriers of an SC-FDMA symbol, transmitted through the same antenna. [Equation 19] describes modulation symbols created by further multiplying the modulation symbols of [Equation 18] by complex values.

$$\begin{bmatrix} y_1^{(1)} \cdot e^{j\theta_1 \cdot 1} & y_1^{(2)} \cdot e^{j\theta_1 \cdot 2} & \ldots & y_1^{(k)} \cdot e^{j\theta_1 \cdot k} & \ldots & y_1^{(M)} \cdot e^{j\theta_1 \cdot M} \\ y_2^{(1)} \cdot e^{j\theta_2 \cdot 1} & y_2^{(2)} \cdot e^{j\theta_2 \cdot 2} & \ldots & y_2^{(k)} \cdot e^{j\theta_2 \cdot k} & \ldots & y_2^{(M)} \cdot e^{j\theta_2 \cdot M} \\ \vdots & \vdots & \vdots & \vdots & \vdots & \vdots \\ y_N^{(1)} \cdot e^{j\theta_N \cdot 1} & y_N^{(2)} \cdot e^{j\theta_N \cdot 2} & \ldots & y_N^{(k)} \cdot e^{j\theta_N \cdot k} & \ldots & y_N^{(M)} \cdot e^{j\theta_N \cdot M} \end{bmatrix} \qquad \text{[Equation 19]}$$

In [Equation 19], each row denotes M modulation symbols to be transmitted on M subcarriers of an SC-FDMA symbol through a particular Tx antenna. Each column denotes N modulation symbols transmitted on a particular subcarrier of the SC-FDMA symbol through N antennas.

According to Embodiment 2, the symbol $x^{(k)}$ mapped to subcarrier k is precoded to $y_1^{(k)}, y_2^{(k)}, \ldots, y_N^{(k)}$. $y_1^{(k)}, y_2^{(k)}, \ldots, y_N^{(k)}$ are then multiplied by different complex values $e^{j\theta_1 \cdot k}, e^{j\theta_2 \cdot k}, \ldots, e^{j\theta_N \cdot k}$, respectively. For instance, in the first column of the matrix expressed as [Equation 19], $y_1^{(1)} \cdot e^{j\theta_1 \cdot 1}$ is transmitted through antenna 1, $y_2^{(1)} \cdot e^{j\theta_2 \cdot 1}$ is transmitted through antenna 2, and $y_N^{(1)} \cdot e^{j\theta_N \cdot 1}$ is transmitted through antenna N.

Also, M modulation symbols transmitted through the same $i^{th}$ antenna, $x_i^{(1)}, x_i^{(2)}, \ldots, x_i^{(M)}$, are multiplied by different complex values $e^{j\theta_i \cdot 1}, e^{j\theta_i \cdot 2}, \ldots, e^{j\theta_i \cdot M}$, respectively. For example, in the first row of the matrix described in [Equation 19], a symbol to be transmitted on subcarrier 1 is $y_1^{(1)} \cdot e^{j\theta_1 \cdot 1}$, a symbol to be transmitted on subcarrier 2 is $y_1^{(2)} \cdot e^{j\theta_1 \cdot 2}$, and a symbol to be transmitted on subcarrier k is $y_1^{(k)} \cdot e^{j\theta_1 \cdot k}$.

The symbols in the first row of the matrix are simultaneously input to the IFFT block and then transmitted through antenna 1. In the same manner, the symbols in the $N^{th}$ row of the matrix are simultaneously input to the IFFT block and then transmitted through antenna N.

In summary, compared to Embodiment 1, each modulation symbol is additionally multiplied by a complex value of which the phase is increased by a predetermined increment for each antenna in Embodiment 2. While a latency does not occur in the time domain because a phase is not changed in the frequency domain in Embodiment 1, signals transmitted through different antennas may have different latencies due to different phases of complex values multiplied for the antennas in Embodiment 2. Since the effective channel that each symbol experiences changes although a CM is not changed much, frequency selectivity is achieved in Embodiment 2. It can be said that a received signal is the sum of waves propagated in a plurality of paths. If a signal transmitted through a particular antenna is delayed in time, some signals in different paths have time delays. Therefore, the sum of the signals is changed at the receiver and thus channels may be changed in phase space from the perspective of the receiver.

The M modulation symbols in each row of the matrix expressed as [Equation 19] are IFFT-processed and attached with a CP, prior to transmission.

[Equation 19] may be given as $$\begin{bmatrix} x^{(1)} \cdot e^{j\phi_1} \cdot e^{j\theta_1 \cdot 1} & x^{(2)} \cdot e^{j\phi_1} \cdot e^{j\theta_1 \cdot 2} & \ldots & x^{(k)} \cdot e^{j\phi_1} \cdot e^{j\theta_1 \cdot k} & \ldots & x^{(M)} \cdot e^{j\phi_1} \cdot e^{j\theta_1 \cdot M} \\ x^{(1)} \cdot e^{j\phi_2} \cdot e^{j\theta_2 \cdot 1} & x^{(2)} \cdot e^{j\phi_2} \cdot e^{j\theta_2 \cdot 2} & \ldots & x^{(k)} \cdot e^{j\phi_2} \cdot e^{j\theta_2 \cdot k} & \ldots & x^{(M)} \cdot e^{j\phi_2} \cdot e^{j\theta_2 \cdot M} \\ \vdots & \vdots & \vdots & \vdots & \vdots & \vdots \\ x^{(1)} \cdot e^{j\phi_N} \cdot e^{j\theta_N \cdot 1} & x^{(2)} \cdot e^{j\phi_N} \cdot e^{j\theta_N \cdot 2} & \ldots & x^{(k)} \cdot e^{j\phi_N} \cdot e^{j\theta_N \cdot k} & \ldots & x^{(M)} \cdot e^{j\phi_N} \cdot e^{j\theta_N \cdot M} \end{bmatrix} \qquad \text{[Equation 20]}$$

In Equation 20, $\phi_i$ and $\theta_i$ in $e^{j\Phi_i}$ and $e^{j\theta_i \cdot k}$ may be changed for each SC-FDMA symbol. $x^{(k)}$, k=1, . . . , M is DFT-processed information to be actually transmitted in a particular SC-FDMA symbol and each element in [Equation 20] represents information prior to mapping to the frequency domain for the IFFT operation for each antenna.

A codebook for precoding in the present invention may be designed as follows.

In Embodiment 1 or Embodiment 2, each element of a precoding vector may be selected from $$\left\{1, \frac{1+j}{\sqrt{2}}, j, \frac{1-j}{\sqrt{2}}, -1, \frac{-1-j}{\sqrt{2}}, -j, \frac{-1+j}{\sqrt{2}}\right\},$$

as illustrated in [Equation 15].

In a 2 Tx system, N=2 in [Equation 15] or [Equation 16]. The elements of $$\left\{\begin{bmatrix}1\\1\end{bmatrix}, \begin{bmatrix}1\\-1\end{bmatrix}, \begin{bmatrix}1\\j\end{bmatrix}, \begin{bmatrix}1\\-j\end{bmatrix}\right\}$$

may be used sequentially as a precoding vector for each SC-FDMA symbol. Alternatively, when information is transmitted in N SC-FDMA symbols, a precoding vector $$\begin{bmatrix}1\\ e^{j\frac{2\pi}{N}k}\end{bmatrix}$$

may be used for a $k^{th}$ SC-FDMA symbol. Herein, k ranges from 0 to N−1.

In a 4 Tx system, N=4 in [Equation 15] or [Equation 16]. Some of rank 1 precoding vectors listed in Table 1, as used in LTE, may be sequentially or randomly applied to each SC-FDMA symbol.

TABLE 1

| | | | | | |
|---|---|---|---|---|---|
| $\begin{bmatrix}1\\1\\1\\1\end{bmatrix}$, | $\begin{bmatrix}1\\-j\\1\\j\end{bmatrix}$, | $\begin{bmatrix}1\\-1\\1\\-1\end{bmatrix}$, | $\begin{bmatrix}1\\j\\-1\\-j\end{bmatrix}$, | $\begin{bmatrix}1\\\frac{1-j}{\sqrt{2}}\\-j\\\frac{-1-j}{\sqrt{2}}\end{bmatrix}$, | $\begin{bmatrix}1\\\frac{-1-j}{\sqrt{2}}\\-j\\\frac{1-j}{\sqrt{2}}\end{bmatrix}$, |
| $\begin{bmatrix}1\\\frac{-1+j}{\sqrt{2}}\\-j\\\frac{1+j}{\sqrt{2}}\end{bmatrix}$, | $\begin{bmatrix}1\\\frac{1+j}{\sqrt{2}}\\-j\\\frac{-1+j}{\sqrt{2}}\end{bmatrix}$, | $\begin{bmatrix}1\\1\\-1\\-1\end{bmatrix}$, | $\begin{bmatrix}1\\-j\\1\\-j\end{bmatrix}$, | $\begin{bmatrix}1\\-1\\-1\\1\end{bmatrix}$, | $\begin{bmatrix}1\\j\\1\\j\end{bmatrix}$, |
| $\begin{bmatrix}1\\1\\1\\-1\end{bmatrix}$, | $\begin{bmatrix}1\\1\\-1\\1\end{bmatrix}$, | $\begin{bmatrix}1\\-1\\1\\1\end{bmatrix}$, | $\begin{bmatrix}1\\-1\\-1\\-1\end{bmatrix}$ | | |

The above-described precoding vectors are presented for illustrative purposes, which should not be construed as limiting the present invention.

Exemplary embodiments described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an exemplary embodiment of the present invention or included as a new claim by a subsequent amendment after the application is filed.

The exemplary embodiments of the present invention may be achieved by various means, for example, hardware, firmware, software, or a combination thereof. In a hardware configuration, a method for transmitting an uplink signal according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the exemplary embodiments of the present invention may be implemented in the form of a module, a procedure, a function, etc. performing the above-described functions or operations. For example, software code may be stored in the memories 980 and 990 and executed by the processors 920 and 930. The memories are located at the interior or exterior of the processors and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

The present invention is applicable to a transmitter and a receiver in a broadband wireless mobile communication system.

What is claimed is:

1. A method for transmitting a signal in a wireless mobile communication device operating in Single Carrier-Frequency Division Multiple Access (SC-FDMA) and Multiple-Input Multiple-Output (MIMO) with N transmit antennas, the method comprising:

generating a sequence of second modulation symbols by Discrete Fourier Transform (DFT)-processing a sequence of first modulation symbols;

generating a sequence of third modulation symbols for each transmit antenna by precoding the sequence of second modulation symbols independently for each transmit antenna; and transmitting a signal generated by Inverse Fast Fourier Transform (IFFT)-processing the sequence of third modulation symbols through a transmit antenna corresponding to the signal, wherein if the sequence of second modulation symbols are denoted by $\{x^{(1)}, x^{(2)}, \ldots, x^{(k)}, \ldots, x^{(M)}\}$ and the sequence of third modulation symbols transmitted on an $n^{th}$ transmit antenna among N transmit antennas are denoted by $\{z^{(1)}, z^{(2)}, \ldots, z^{(k)}, \ldots, z^{(M)}\}$, the sequence of second modulation symbols and the sequence of third modulation symbols are in a relationship that $z^{(k)}=x^{(k)}\cdot e^{j\phi_n}\cdot e^{j\theta_n k}$ where $\phi_n$ and $\theta_n$ are predetermined values, M is a number of subcarriers included in a transmission band of the signal, k is a location of a subcarrier to which $x^{(k)}$ and $z^{(k)}$ are mapped, and $1 \leqq k \leqq M$ and $1 \leqq n \leqq N$ are satisfied.

2. The method according to claim 1, further comprising changing a precoding vector used for the precoding for each SC-FDMA symbol.

3. The method according to claim 1, wherein $\phi_n$ is a value pre-selected from $$\left\{0, \frac{2\pi}{L}\cdot 1, \frac{2\pi}{L}\cdot 2, \ldots, \frac{2\pi}{L}\cdot(L-1)\right\},$$

and wherein L is equal to M.

4. The method according to claim 3, further comprising changing $\phi_n$ for each SC-FDMA symbol.

5. The method according to claim 4, wherein $\theta_n=0$.

6. The method according to claim 1, wherein $\theta_n$ is a value pre-selected from $$\left\{0, \frac{2\pi}{L}\cdot 1, \frac{2\pi}{L}\cdot 2, \ldots, \frac{2\pi}{L}\cdot(L-1)\right\},$$

and wherein L is equal to M.

7. The method according to claim 6, further comprising changing $\phi_n$ for each SC-FDMA symbol.

8. The method according to claim 1, wherein when N=2, $$\begin{bmatrix}\phi_1\\ \phi_2\end{bmatrix}$$

is selected from $$\left\{\begin{bmatrix}1\\1\end{bmatrix}, \begin{bmatrix}1\\-1\end{bmatrix}, \begin{bmatrix}1\\j\end{bmatrix}, \begin{bmatrix}1\\-j\end{bmatrix}\right\}.$$

9. The method according to claim 1, wherein when N=4, $$\begin{bmatrix}\phi_1\\ \phi_2\\ \phi_3\\ \phi_4\end{bmatrix}$$

is selected from $$\left\{\begin{matrix}\begin{bmatrix}1\\1\\1\\1\end{bmatrix}, \begin{bmatrix}1\\-j\\1\\j\end{bmatrix}, \begin{bmatrix}1\\-1\\1\\-1\end{bmatrix}, \begin{bmatrix}1\\j\\-1\\-j\end{bmatrix}, \begin{bmatrix}1\\ \frac{1-j}{\sqrt{2}}\\ -j\\ \frac{-1-j}{\sqrt{2}}\end{bmatrix}, \begin{bmatrix}1\\ \frac{-1-j}{\sqrt{2}}\\ -j\\ \frac{1-j}{\sqrt{2}}\end{bmatrix}, \begin{bmatrix}1\\ \frac{-1+j}{\sqrt{2}}\\ -j\\ \frac{1+j}{\sqrt{2}}\end{bmatrix}, \\ \begin{bmatrix}1\\ \frac{1+j}{\sqrt{2}}\\ -j\\ \frac{-1+j}{\sqrt{2}}\end{bmatrix}, \begin{bmatrix}1\\1\\-1\\-1\end{bmatrix}, \begin{bmatrix}1\\-j\\1\\-j\end{bmatrix}, \begin{bmatrix}1\\-1\\-1\\1\end{bmatrix}, \begin{bmatrix}1\\j\\1\\j\end{bmatrix}, \begin{bmatrix}1\\1\\1\\-1\end{bmatrix}, \begin{bmatrix}1\\1\\-1\\1\end{bmatrix}, \begin{bmatrix}1\\-1\\1\\1\end{bmatrix}, \begin{bmatrix}1\\-1\\-1\\-1\end{bmatrix}\end{matrix}\right\}.$$

* * * * *